US007761849B2

(12) United States Patent
van Woerkom et al.

(10) Patent No.: US 7,761,849 B2
(45) Date of Patent: Jul. 20, 2010

(54) AUTOMATED ANALYSIS AND RECOVERY OF LOCALIZATION DATA

(75) Inventors: Norbert van Woerkom, Bray (IE); Terry Farrell, Mount Merrion (IE); Patrick Ryan, Killaloe (IE); Gavin McKeown, Ongar Park (IE)

(73) Assignee: Microsoft Corporation, Redmond, WA (US)

( * ) Notice: Subject to any disclaimer, the term of this patent is extended or adjusted under 35 U.S.C. 154(b) by 1364 days.

(21) Appl. No.: 11/212,414

(22) Filed: Aug. 25, 2005

(65) Prior Publication Data

US 2007/0050757 A1 Mar. 1, 2007

(51) Int. Cl.
G06F 9/44 (2006.01)
G06F 9/45 (2006.01)

(52) U.S. Cl. ............... 717/120; 717/122; 717/106; 717/107; 717/136

(58) Field of Classification Search ........... 717/120, 717/122, 106, 107, 136
See application file for complete search history.

(56) References Cited

U.S. PATENT DOCUMENTS

| 5,664,206 A | 9/1997 | Murow et al. ............ 704/8 |
| 6,035,121 A | 3/2000 | Chiu et al. ............ 395/705 |
| 6,717,588 B1 | 4/2004 | Miller et al. ............ 345/700 |
| 7,007,026 B2 * | 2/2006 | Wilkinson et al. ............ 707/10 |
| 2002/0107684 A1 | 8/2002 | Gao ............ 704/4 |
| 2003/0115186 A1 * | 6/2003 | Wilkinson et al. ............ 707/3 |
| 2005/0009538 A1 * | 1/2005 | MacKay et al. ............ 455/456.3 |
| 2005/0050526 A1 | 3/2005 | Dahne-Steuber et al. ..... 717/136 |

FOREIGN PATENT DOCUMENTS

| EP | 1 315 086 A1 | 5/2003 |
| WO | WO 00/73893 | 12/2000 |

OTHER PUBLICATIONS

Yeo, A. W. "Global-Software Development Lifecycle: An Exploratory Study", 2001, ACM, p. 104-111.*

* cited by examiner

Primary Examiner—Wei Y Zhen
Assistant Examiner—Qamrun Nahar
(74) Attorney, Agent, or Firm—Merchant & Gould, P.C.

(57) ABSTRACT

Recovery of localization data is provided between versions of a software product. A first resource is identified that is associated with a first version of the software product. A second resource is identified that is associated with a second version of the software product. A first resource identifier associated the first resource is different from a second resource identifier associated with the second resource. The first resource is mapped to the second resource when the second resource is found to be a shifted version of the first resource. The localization data corresponding to the first resource from the first version is migrated to the second version and the localization data is associated with the second resource from the second version when the second resource is a shifted version of the first resource.

20 Claims, 7 Drawing Sheets

AUTOMATED ANALYSIS AND RECOVERY OF LOCALIZATION DATA

FIELD OF THE INVENTION

The present invention relates to computers, and more particularly to the analysis and recovery of localization data.

BACKGROUND

Computer hardware and software vendors seeking to expand their market internationally are required to localize the related operating system and software applications to accommodate the language, laws, customs and culture of individual target markets. Different cultures and countries have different rules for punctuation, grammar, currency measures and conversions, number formats and other unique factors associated with a particular location. For example, the Chinese language includes thousands of characters requiring a double byte character set to represent a single character, whereas the character set used in the United States includes less than 256 characters each of which can be accommodated by a single 8 bit byte.

Localization is a labor and cost intensive process that requires the employ of both translators and software designers. The translation itself is often the largest and most difficult portion of the localization process. Often when resources of a software product are translated there may be a number of associated problems that arise. For example, a dialog or window that is translated may need to be resized because the translated text within the dialog or window is larger than provided by the software product in the original language. Often, the translation of a text string is significantly longer than the original source string, depending on the languages involved in the translation.

The localization process is often required for each stage in development for a particular software product. As aspects of the software product change and new features are added, previous features of the software product may be moved, renamed, or otherwise changed. Accordingly, the newer version of the product may have a number of changes when compared to the previous version, other than the new material and features added. Localization of the product requires discovery and accounting of these changes, otherwise the new version of the localized product may include a host of errors. Customers demand that the localization of different releases of the same product remain consistent, and that new releases and user updates are available at the same time as they are announced in the original country where the software product originated.

SUMMARY

Aspects of the present invention are generally related to analysis and recovery of localization data due to resource shifts that occur between versions of a software product. The resource shifts correspond to resources that have been retained for the newer version of the software product, but have otherwise been moved or had their resource identifier (unique identifier) changed. In accordance with one aspect of the present invention, direct resource matching provides a mapping between the resource identifiers of the resources for different versions of a software product. The mapping associates a first format for a resource identifier with a second format for a resource identifier. The resources and their identifiers for the old version of the software product are stored in an old localization database, while the resources and their identifiers for the new version of the software product are stored in a new localization database. Those resource identifiers in the old localization database that match the first format are matched to the resource identifiers in the new localization database that match the second format. Accordingly, localization data that was previously not recycled due to the change in resource identifier are recyclable due to the association made between resource identifiers of the software product.

In accordance with another aspect of the present invention, indirect resource matching provides for match measurable aspects of the resources themselves to determine the level that a resource corresponding to a resource shift matches a resource from the old version of the software product. A confidence level is calculated for the resources that potentially match a particular mapping of a resource. If the confidence level of a match reaches a specified threshold, the resources are considered matching, and the localization data from the previous version for that resource may be migrated to the new version of the software product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
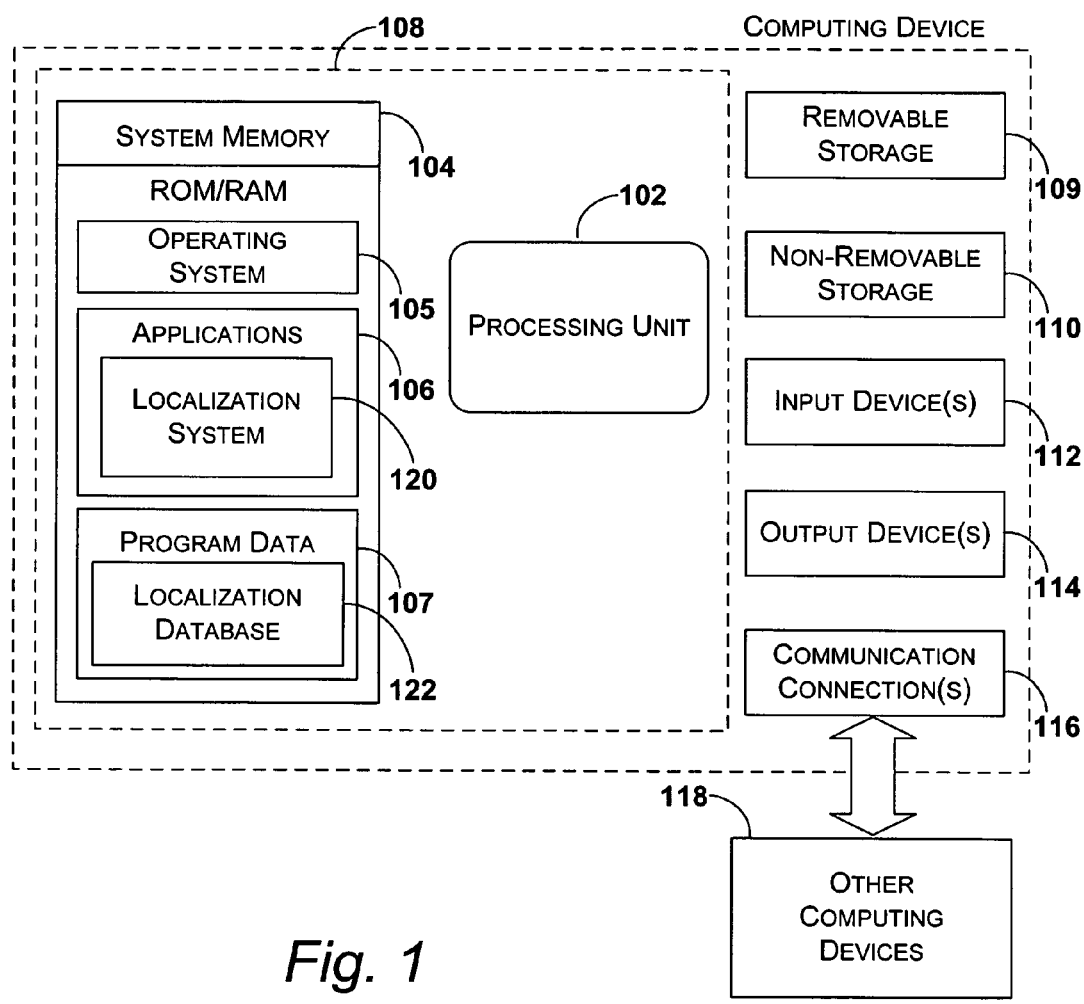
FIG. 1 illustrates an exemplary computing device that may be used in accordance with one exemplary embodiment.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a Localization System 120 for implementing the system of the present invention. Additionally, program data 107 includes Localization Database 122. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by computing device 100 provides for automated analysis and recovery of data after resource shifts that occur between versions of a software product. A shift in resources may cause a change in the resource identifier associated with that resource. With the change in the resource identifier, the resource of the new version is not recognized as matching the resource of the previous version of the software product. A mapping is provided that associates the resource identifier of the resource in the previous version with the resource identifier of the shifted resource in the new version of the software product. The mapping is a direct mapping or an indirect mapping that provides a confidence level that a match is present. When a match is established, the localization data for that resource may be recycled. The indirect mapping is used when a match between resources is not readily determinable. The indirect mapping provides a matching algorithm that may be used to identify matching resources between versions of the software product.

Except for a broader meaning that allows the disclosure and claims herein to encompass a wider variety of alternative embodiments, the following terms as used herein and throughout the claims are generally defined as follows:

"Dialog" is generally defined as part of the user interface of a software product. It contains of several controls (for example, buttons, text-input boxes, radio buttons, and checkboxes). Dialogs may be associated with any operating system, application, or other software related platform.

"Localizable resource" is generally defined as a part of a software product that needs to be localized. Examples of localizable resources include, but are not limited to, text to be translated, dialog controls to be translated and resized (for example a dialog button), and artwork (bitmaps, icons) that may have changed from the previous version of the software product.

"Localization database" is generally defined as a store for localizable resources. The localization database is further described below with relation to FIGS. 2-6.

"Localization data" is generally defined as a localizable resource accompanied by additional information pertaining to that resource. Examples of additional information include localization instructions or rules (e.g., rule=maximum length of the translation should not exceed 10 characters).

"Parser" is generally defined as a resource extractor and "replacer" application module. Parsers extract localizable resources from source files (see definition below) and, once localization is complete, create copies of the source files with the localized resources in place. The new copies of the source files correspond to the updated or new version of the software product.

"Recycling" is generally defined as a method of maintaining localization information between different versions of a software product. A goal of developers dealing with localization is to recycle as much of the previous version of the software product as possible when localizing the new version of the software product.

"Regular expressions" are generally defined as a type of expression that allows for efficiently creating, comparing, and modifying strings as well as rapidly parsing large amounts of text and data to search for, remove, and replace text patterns. The regular expression language is designed and optimized to manipulate text. The language comprises two basic character types: literal (normal) text characters and metacharacters. The set of metacharacters gives regular expressions their processing power. For example, the metacharacter "*" in example*.doc stands in for any file name in front of the file name extension. Regular expressions provide a large set of such metacharacters that make it possible to describe very complex text-matching expressions with relatively few characters. For example, the regular expression \s2000, when applied to a body of text, matches all occurrences of the string "2000" that are preceded by any white-space character, such as a space or a tab. Regular expressions may also perform searches that are more complex. For example, the regular expression (?<char>\w)\k<char>, using named groups and backreferencing, searches for adjacent paired characters. When applied to the string "I'll have a small coffee" it finds matches in the words "I'll", "small", and "coffee".

"Resource identifier" is generally defined as a unique identifier, assigned to each resource. The resource identifier may take any form, such as including the filename in the identifier, or comprising its own separate unique identifier "Resource node" is generally defined as group of resources, for example, all text and controls that make up a windows dialog.

"Resource shift" is generally defined as a change in resource identifiers between versions of the software product for the same localizable resource that results in failed localization recycling and subsequent loss of localization data. In accordance with embodiments herein described, the localization data may be recovered as provided in the accompanying descriptions below.

"Software localization" or "localization" is generally defined as altering a software product (e.g., "translation") so that it is appropriate for the particular geographic region in which the software product is used.

"Source file" is generally defined as a file (any type) in the original or previous version of the software product.

"Version" or "software version" generally refers to the different iterations of a software product. When referring to "versions", the differences between versions are not limited to the differences between the commercially available versions of a software product. A discussion of "versions" also includes the incremental versions created in producing the commercially available product. Stated differently, any type of update to a software product results in a new "version" of the software product no matter how minimal the change between the first version and the second version. Therefore, a particular development project may go through hundreds or thousands of versions before the commercially viable product is created.

During the software localization process, it is common practice to isolate the parts of the software product that need to be localized, from the original product. These localizable resources may vary from as simple as just a string that needs to be translated, to more complicated cases like controls that need both translated and resized. The localization process aims to isolate the localizable resources into a practical, easy to localize, format. The actual localization (translation, resizing, reshaping, etc) is applied to these isolated resources. The collection of localizable resources isolated from the original product is stored in a localization database.

For the different file types associated with a typical software product, parsers have been developed in order to assist with the isolation of the localizable resources from the original files. The parsers are configured to parse the original source file (.xml, .dll, .exe, or other) to extract the localizable resources and store these in the localization database. The parsers are also configured to create a copy of the original source file once the localization process is complete with the localized resources replacing the original resources. Replacement of the original resources with the localized resources ultimately results in a localized product.

Figure 2:
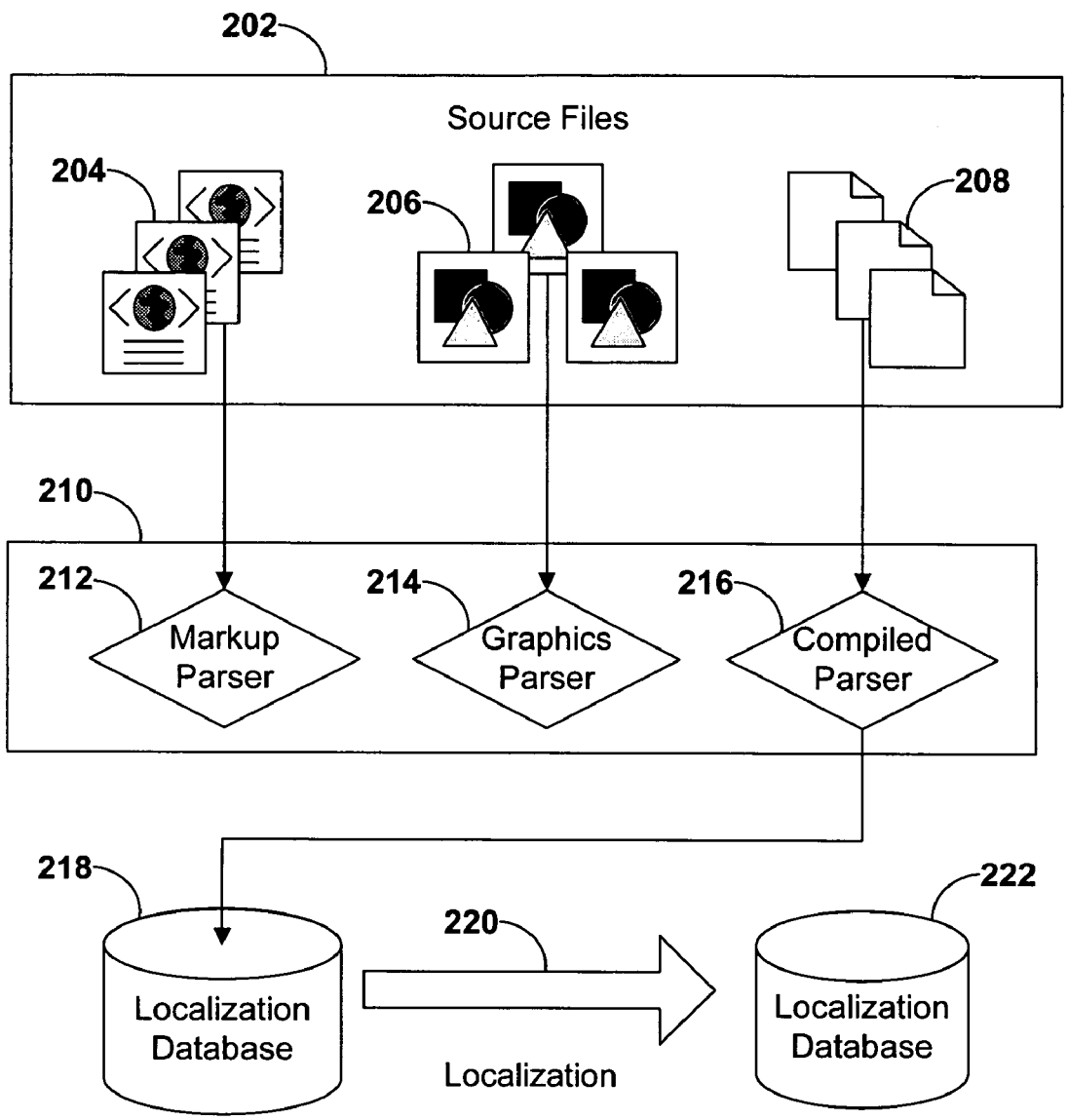
FIG. 2 illustrates a functional diagram of an exemplary system for producing a localization database including localized resources.

FIG. 2 illustrates a functional diagram of an exemplary system for producing a localization database including localized resources in accordance with one embodiment. System 200 includes an original source files 202, parsers 210, localization database before localization 218, localization process 220, and localization database after localization 222. Original source files 202 correspond to the new version of the software product and include markup files 204, graphics files 206, and compiled files 208. In one embodiment, a "compiled file" refers to files such as dynamic link libraries (.dlls) and executable files (.exes). Parsers 210 include markup parser 212, bitmap parser 214, and compiled file parser 216.

Parsers 210 isolate the localizable resources from original resource files 202, and extract the localizable resources into localization database 218. Localization process 220 is applied to localization database 218 to produce localization database 222 that includes the localized resources. Parsers 210 create a unique identifier or resource identifier for each of the localizable resources. The resource identifier is stored along with the localizable resources in localization database 218. In accordance with one embodiment, parsers 210 generate the same resource identifier for a certain resource, as long as the structure of the source file does not change. Having the same resource identifier provides unambiguous information for the parser to be able to replace the correct original resource in the target file when creating the localized version of the target file. Also, when a resource changes in the original product (for example, the wording of the original text changes), parsers 210 does not create a new unique identifier, but recreates the same identifier. With the same resource identifier the previous translation and related localization data for the previous version of the software product does not get lost and may be reused for during localization process 220.

System 200 may include more types of source files than those shown included in original source files 202, and may included additional parsers than those shown in parsers 210. It is appreciated that localization process 220 may follow many different selected process variations without departing from the spirit and scope of the invention. For example, in one embodiment the translators and developers are handed the entire code and are allowed to recompile the code in creating the localized software product. In other embodiments, the translators and developers are not allowed to recompile the code, and instead are provided with executables and other file formats for localization. The ability to recompile the code greatly increases the ability of the developers to locate and recycle resources between versions of a software product.

Figure 3:
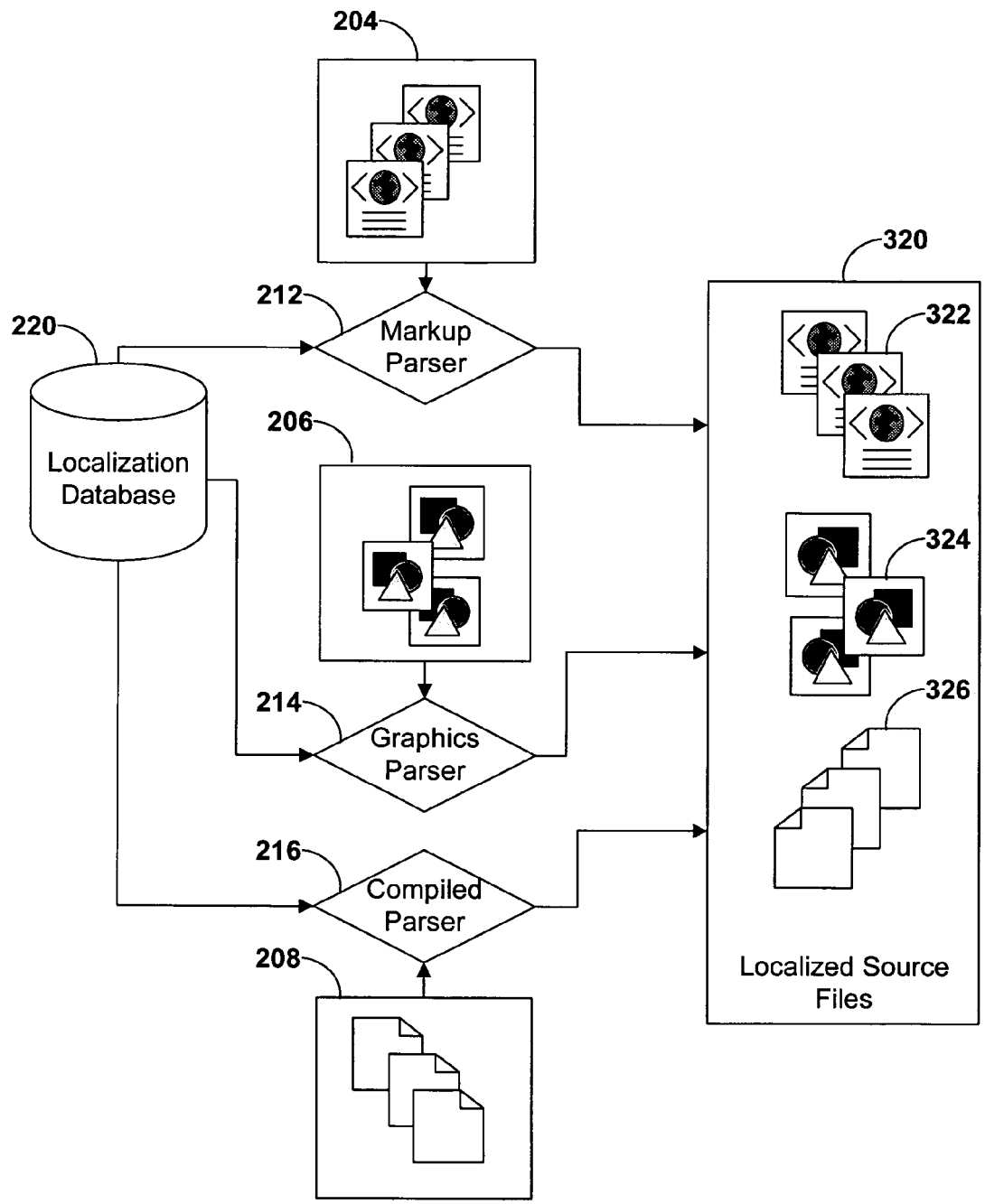
FIG. 3 illustrates a functional diagram of an exemplary system for producing localized files of a software product.

FIG. 3 illustrates a functional diagram of an exemplary system for producing localized files of a software product in accordance with one embodiment. System 300 includes localization database with localized resources 220, parsers 212, 214, 216, original source files 204, 206, 208, and localized source files 320. Localized source files 320 include localized markup files 322, localized graphics files 324, and localized compiled files 326.

With the localization of the resources in localization database 220 completed, parsers 212, 214, and 216 create a copy or localized version of the source files, but with the localized resources in place. Eventually, generation of the localized source files results in a localized version of the software product.

The process for generating a localized version of a software product as described in FIGS. 2 and 3 may be repeated as necessary for a variety of languages.

A change that occurs between versions of a software product includes when resources move between the different files that make up a software product. The resource might move to a different file of the same type, or another file type altogether. In one embodiment, the resource identifier assigned to the resource changes as a result of the move of the resource. The change of the resource identifier results in the loss of localization data (the translation, etc) since the connection between the old and new resource is lost. This is referred to as a resource shift when it occurs. Other causes for resource shifts include changes made by developers that unexpectedly alter the resource identifiers (e.g., inserting new resources might cause old resources to shift). There are also resource shifts when the logic in a parser is changed, which results in the resource identifier changing. A change of databases may also result in a resource shift since moving the resource from one localization database to another may result in the localization data being lost. Additionally, a change of source file name may also result in a resource shift since the change of source file names results in different resource identifiers being generated. For example, after a resource has been localized in multiple languages for a certain version of a software product, a subsequent version of the same product may have reorganized the resources differently (e.g., into different files), without actually changing the resources. Therefore, when a parser (e.g., 212, 214, 216) isolated the resources out of the new version of the software product, the parser generated a different resource identifier, and therefore the ability to tie this resource to the old localization data was not longer available. Embodiments described herein allow recycling of the localization data by mapping the old resource identifier with the newly generated resource identifier. Generally, it is desirable to recycle the localization data as opposed to re-localizing the resources since localization often represents a significant monetary value. For example, adding ten words between versions of a software product, and localizing the software product into one hundred languages, results in ten thousand words for translation. Costs for translation are usually calculated per word, and currently may run at 50 cents per word, resulting in a charge of 5000 euros for localization of the software product.

Figure 4:
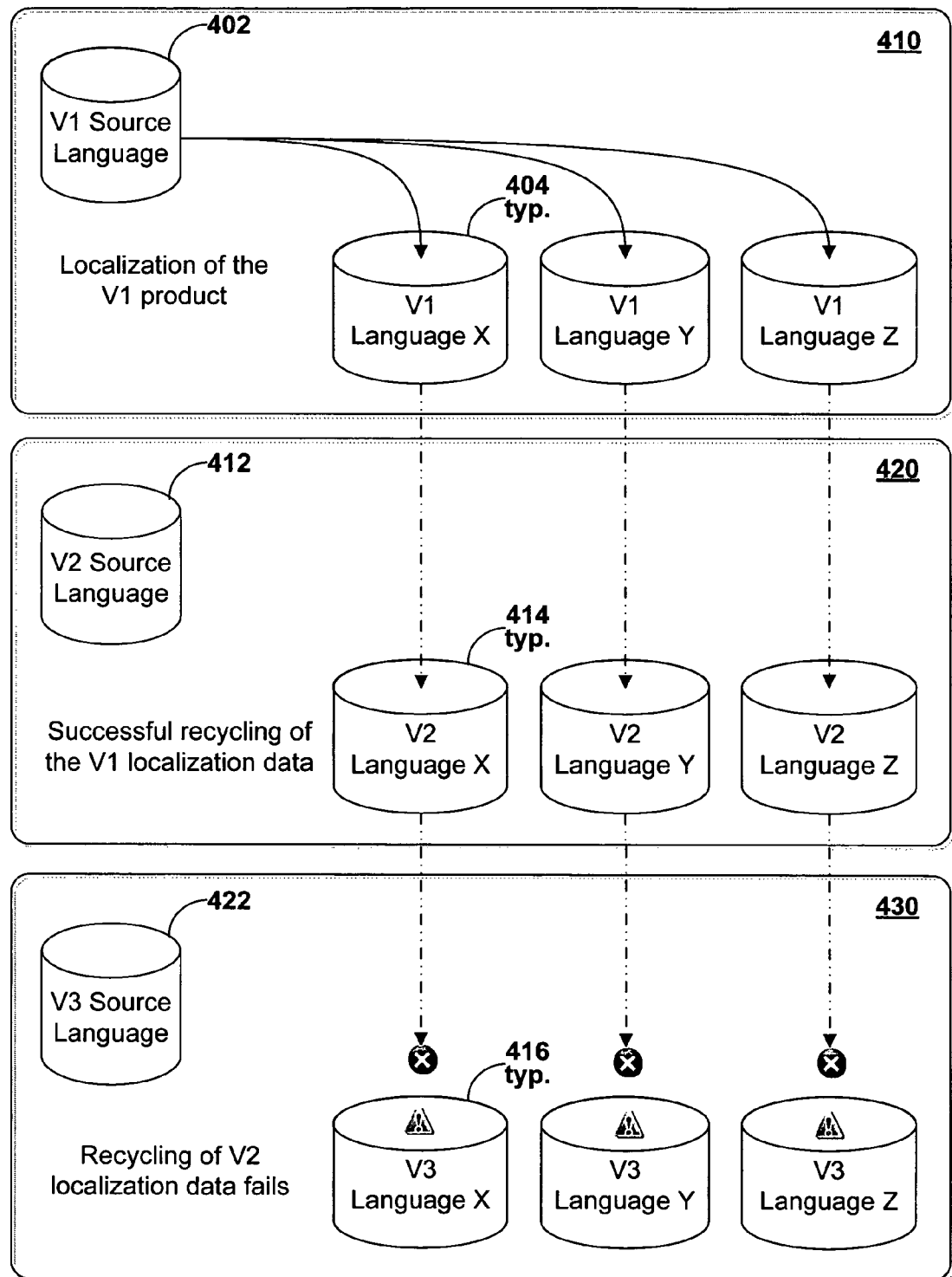
FIG. 4 illustrates localization recycling and the effect of resource shifts for a hypothetical software product that is localized in three languages.

FIG. 4 illustrates localization recycling and the effect of resource shifts for a hypothetical software product that is localized in three languages in accordance with one embodiment. In the example shown, localization recycling begins with operation 410 for localizing first version (V1) of a software product. V1 resources, which have been extracted from source files 402 from the first version of the software product, are localized into three languages. Localization databases correspond each one of the three languages (e.g., 404) and include the localized resources.

In the example shown, the second version (V2) of the software product represents a minor update form the first version (V1). The update to the second version does not include resources shift in this example, and therefore, the resource identifiers are consistent. Operation 420 provides for recycling of localization databases (e.g., 414) to create the second version of the software product. The previous localization databases (e.g., 404) are recycled to create the second version (V2) of the localization databases (e.g., 414). Without resource shifts, the localization for the second version (V2) is limited to new or updated resources in V2 source language 412.

The third version in this example represents a reorganization of the resources. For example, resources are moved to new file-types or new features are inserted, or other actions are taken that result in resource shifts between the second version (V2) and the third version (V3). In operation 430, resource identifiers for many resources change. Without including the functionality of the embodiments described herein, recycling from the second version fails. Failure of the recycling results in requiring that the shifted resources be re-localized from V3 source language files 422, even though a resource has not actually changed between the second version (V2) and the third version (V3).

The embodiments described herein reduce the impact of resource shifts associated with the update from the second version (V2) of the software product to the third version (V3). The resources in the localization database associated with the second version (V2) of the software product are mapped to the resources in the new localization database associate with third version (V3) of the software product. The mapping information is used to migrate the localization data into the new databases for one or more subsequent languages, effectively negating the impact of the resource shift, and boosting the recycling results. In one embodiment mapping is performed through direct resource identifier matching. In another embodiment, the mapping is performed through indirect resource matching.

Figure 5:
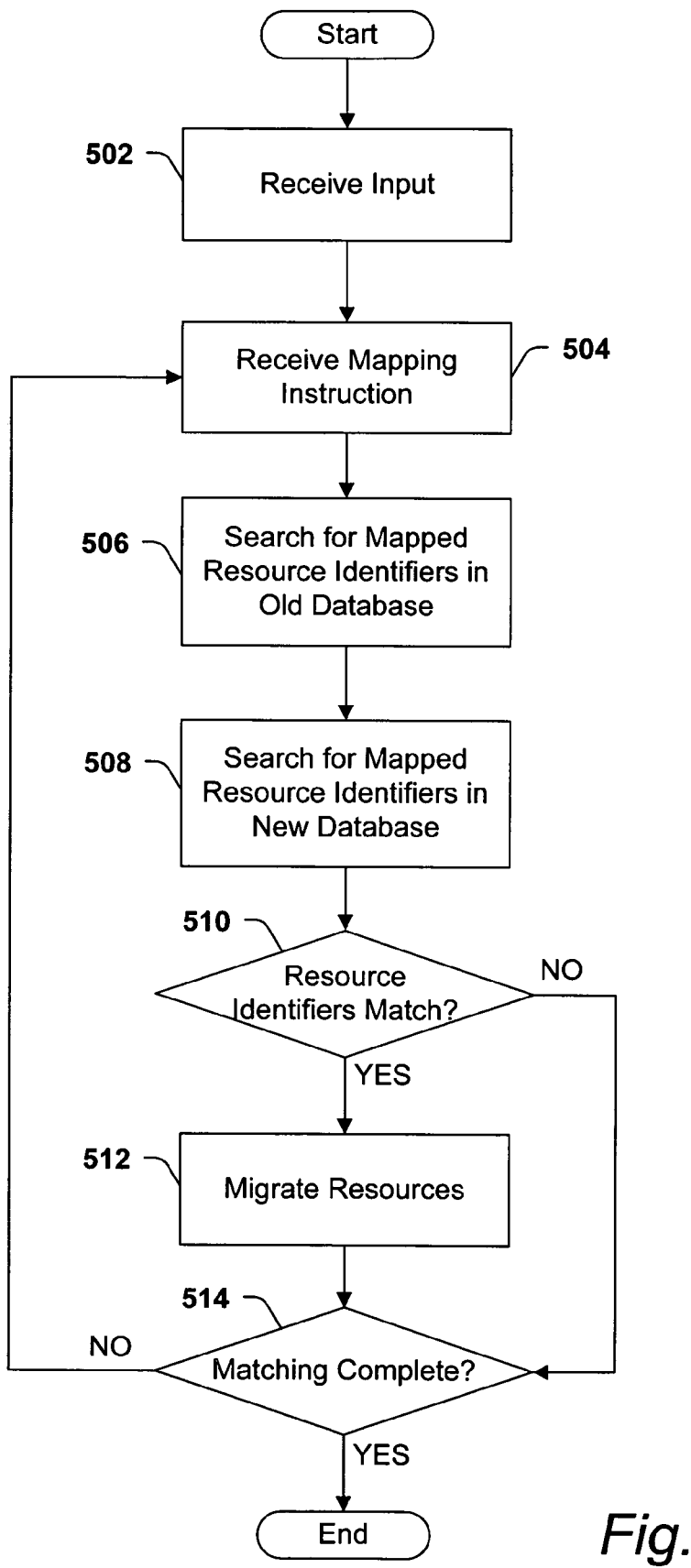
FIG. 5 illustrates a flow diagram representing an exemplary embodiment for a direct resource identifier matching process.

FIG. 5 illustrates a flow diagram representing an exemplary embodiment for a direct resource identifier matching process in accordance with one embodiment. When process 500 starts, a new version of a software product has been created and the localizable resources have been identified and stored in a localization database. Processing continues with input operation 502.

Input operation 502 receives an input of the parameters and instructions for identifying matching resources. For example, the input may contain the location of two localization databases, one in the state right before the resource shift has occurred (and therefore with all the localization data present), and one right after the resource shift happened (with all localization data lost). These two databases are referred to throughout this process as the old database and the new database respectively. After the parameters and instructions are received, processing continues to mapping operation 504.

Mapping operation 504 receives the mapping instruction for matching a first resource identifier with a second resource identifier. In one embodiment, the mapping instruction corresponds to node level matching. For example, the name of the file which contains the resources may have has changed so that the resource identifier of the file also changed. An example of old resource identifiers before the resource shift may include:

(1) importloc.xml|loc|account.tab.general.label,0;xml: text,42; and (2) importloc.xml|loc|contact.field.creditonhold.option.1.label, 0;xml:text,42.

The resource shift may correspond to a change in the source file from "importloc.xml" to "importloc20.xml". Accordingly, the new resource identifiers after the resource shift correspond to the following:

(3) importloc20.xml|loc|account.tab.general.label,0;xml: text,42; and (4) importloc20.xml|loc|contact.field.creditonhold. option.1.label,0;xml:text,42;

wherein the resource identifier (3) corresponds to the same resource as resource identifier (1) and resource identifier (4)

corresponds to the same resource as resource (2) in different versions of the same software product.

In this example, the parser itself (that generated these resource identifiers) has not changed. According to one embodiment, resources are grouped in nodes in the localization database. The resources of separate versions of the software product may be matched according to the nodes to which they belong, or by node level matching. The following extensible markup language (XML) instruction demonstrates a mapping instruction for implementing node level matching:

```
<Mapping>
    <Node recursive="yes">
        <OldResId>ImportLoc.xml|Loc</OldResId>
        <NewResId>ImportLoc20.xml|Loc</NewResId>
    </Node>
</Mapping>
```

In another embodiment, regular expressions may be used to match resource identifiers between versions of a software product. For example, a combination of a filename-change (e.g., platform.xml becomes database.xml) and a parser change (e.g., parser logic provides for different naming convention) may have occurred between versions of a software product. An example of old resource identifiers before the resource shift may include:

(5) platform.xml|loc|attributedescription.account. donotbulkemail,0;xml:text,42; and (6) platform.xml|loc|attributedescription.logon.expiration,0; xml:text,42;

The new resource identifiers after the resource shift then correspond to the following:

(7) database.xml|loc|account.donotbulkemail.description, 0;xml:text,42; and (8) database.xml|loc|logon.expiration.description,0;xml: text,42;

wherein the resource identifier (5) corresponds to the same resource as resource identifier (6) and resource identifier (7) corresponds to the same resource as resource (8) in different versions of the same software product.

To trace the resource between the different versions, the following mapping is provided:

```
<Mapping>
    <Resource match="regex">
        <OldResId>platform.xml|loc|attributedescription.(.*?),0;
        xml:text,42</OldResId>
        <NewResId>database.xml|loc|(.*?).description,0;xml:text,42
        </NewResId>
    </Resource>
</Mapping>
``` wherein the regular expression "(.*?)" is provided in the mapping. The regular expression allows any text string to be matched to that portion of the resource identifier. Once a mapping instruction similar to those provided above is received, processing continues with search operation 506.

Search operation 506 searches for the old resource identifier that is listed in the mapping instruction in the old database. In the first example above for the node level matching, the old database is opened and a search is performed to locate the resource identifiers under the node "ImportLoc.xml|Loc".

Searching for each resource identifier under this node locates both resource identifier (1) and (2) in the old database.

Similarly, in the second example above using the regular expression, the old database is opened and search is performed to locate the resource identifiers that follow the specific pattern outlined in the <OldResID> tag of the mapping instruction. The regular expression (.*?) may be mapped to any string. Searching for each resource identifier according to this pattern locates both resource identifiers (5) and (6) in the old database. Additional embodiments may even use a combination of node level matching and regular expressions to map a new resource identifier to an old resource identifier. Whether node level matching is used and/or regular expressions, once the old database is searched, processing continues to search operation 508.

Search operation 508 searches for the new resource identifier that is listed in the mapping instruction in the new database. In the first example above for the node level matching, the new database is opened and a search is performed to locate the resource identifiers under the node "ImportLoc20.xml|Loc". Searching for each resource identifier under this node locates both resource identifier (3) and (4) in the new database.

Similarly, in the second example above using the regular expression, the new database is opened and search is performed to locate the resource identifiers that follows the specific pattern outlined in the <NewResID> tag of the mapping instruction. Again, the regular expression (.*?) may be mapped to any string. In another embodiment, the regular expression is replaced with the same data that replaced the regular expression when the old database was searched. Searching for each resource identifier according to this pattern locates both resource identifiers (7) and (8) in the new database. Whether node level matching is used and/or regular expressions, once the new database is searched, processing continues to match decision operation 510.

Match decision operation 510 determines whether the resources located in the old database according to the old resource identifier pattern listed in the mapping instruction actually match the resources located in the new database according to the new resource identifier pattern in listed in the mapping instruction. If the resources actually do not match, processing advances to completion decision operation 514. However, if the resources located do match, processing continues with migration operation 512.

Migration operation 512 migrates the localization data associated with resource of the old version with the corresponding resource of the new version of the software product. For example, the localization database for a particular resource may include information that corresponds to localization data for that resource. The localization data may include such data as translation, resizing, graphic, and other information used in localizing the resource. In one embodiment, migrating the localization data transfers the data from the localization database corresponding to the old version of the software product to the localization database associated with the new version of the software product. Once the localization data is migrated, processing continues to completion decision operation 514.

Completion decision operation 514 determines whether the process of matching resources is complete. If the process is not complete, processing returns to mapping operation 504 where process 500 may be repeated for other mapping instructions. However, if the process is complete process 500 ends and processing moves on to other tasks for localization of the software product. In one embodiment, each mapping instruction is tested for a selected language before being applied to the remaining languages for localization. When the mapping instruction is finalized and verified to be working correctly on a trial language, it can immediately be used on one or more previously localized languages in order to salvage the localization data.

The examples described above in connection with process 500 are considered relatively simple resource shifts. Often however, resource shifts are much more complicated and therefore not easy to fix with a direct attempt to match up the resource identifiers.

Figure 6:
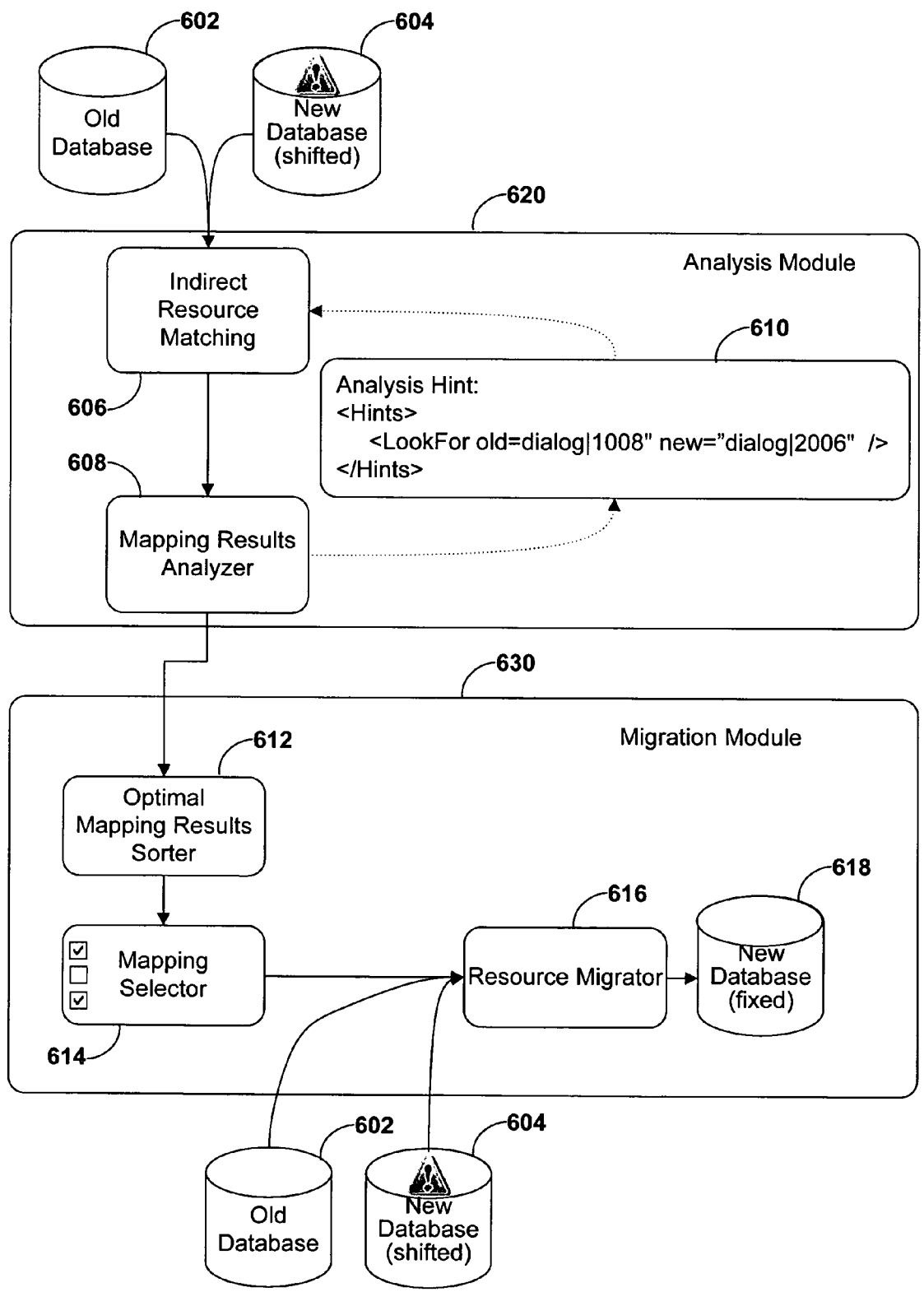
FIG. 6 illustrates a functional diagram of an exemplary system for indirect resource matching analysis and migration of localization data.

FIG. 6 illustrates a functional diagram of an exemplary system for indirect resource matching analysis and migration of localization data in accordance with one embodiment. System 600 includes analysis module 620, migration module 630, old database 602 that corresponds to a previous version of the software product, and new database 604 that includes the shifted resources corresponding to a new version of the software product. Analysis module 620 includes indirect resource matching algorithm 606, mapping results analyzer 608, and analysis hint module 610. Migration module includes optimal mapping results sorter 612, mapping selector 614, resource migratory 616, and new database 618 with the shifted resources fixed to be associated with the localization data of the corresponding resource from the previous version of the software product. Again, the two databases are available: "old" database 602, just before the resource shift was introduced, and "new" database 604 with the shifted resources.

Indirect resource matching algorithm 606 analyzes the actual resource instead of trying to find a pattern in the resource identifiers. The information about the original values of the resource (source term for example) is present in both localization databases (602, 604), and should be similar. Therefore, it is possible to find the same resource in both old and new databases based on the resource information.

However, since many similar resources in old database 602 and new database 604 the indirect matching algorithm is adaptable to analysis results. For example, a localization database with several dialogs may have a 'Cancel' button on each of the dialogs. This 'Cancel' button is a localizable resource (the text needs to be translated, the button might need to be resized, etc). If these resources have been shifted, indirect matching of these resources might not be available since the resources are almost identical. Indirect resource matching algorithm 606 produces an exhaustive map of resource identifiers in the old and new database (602, 604), based on comparing the resources themselves. The process is improved by providing instructions or hints from hint module 610. In one embodiment, the hints are generated from an initial run of the indirect matching algorithm 606.

Analysis module 620 determines which resources might have shifted in both the old and new localization databases (602, 604). This is done by comparing the two databases: old resources that have an identifier which is not found in the new database, and vice-versa, are potentially shifted resources. The indirect resource matching algorithm (606) is then performed on the potentially shifted resources. A more detailed description of the indirect resource matching algorithm is provided below in the discussion of FIG. 7.

The mapping results are then analyzed by mapping results analyzer 608. In one embodiment, mapping results analyzer 608 corresponds to a user interface that allows a user to analyze the results of the algorithm. Hints may then be provided by hint module 610 so that indirect resource matching algorithm 606 may be run again to further refine the results. Eventually, optimal mapping results sorter 612 produces an optimal set of mappings between resources of the two versions of a software product. In one embodiment, optimal mapping results sorter 612 is another user interface that allows the user to sort the mapping results produced by indirect resource matching algorithm 606. From the optimal list of mappings, mapping selector 614 selects the mappings so that the shifted resources in new database 604 are matched with the original resource of old database 602. In one embodiment, the mappings are extendible so that it is open for editing. A user may select the mappings for migration and may manually add more mappings. The localization data of these matching resources may then be migrated from old database 602 to new database 604 by resource migratory 616. A new database (618) is then produced that includes the localization data for the shifted resources where a match was found with an original resource of old database 602.

It is appreciated that the process of performing the matching algorithm and subsequent mapping selection may be repeated several times in order to achieve the best possible result.

Figure 7:
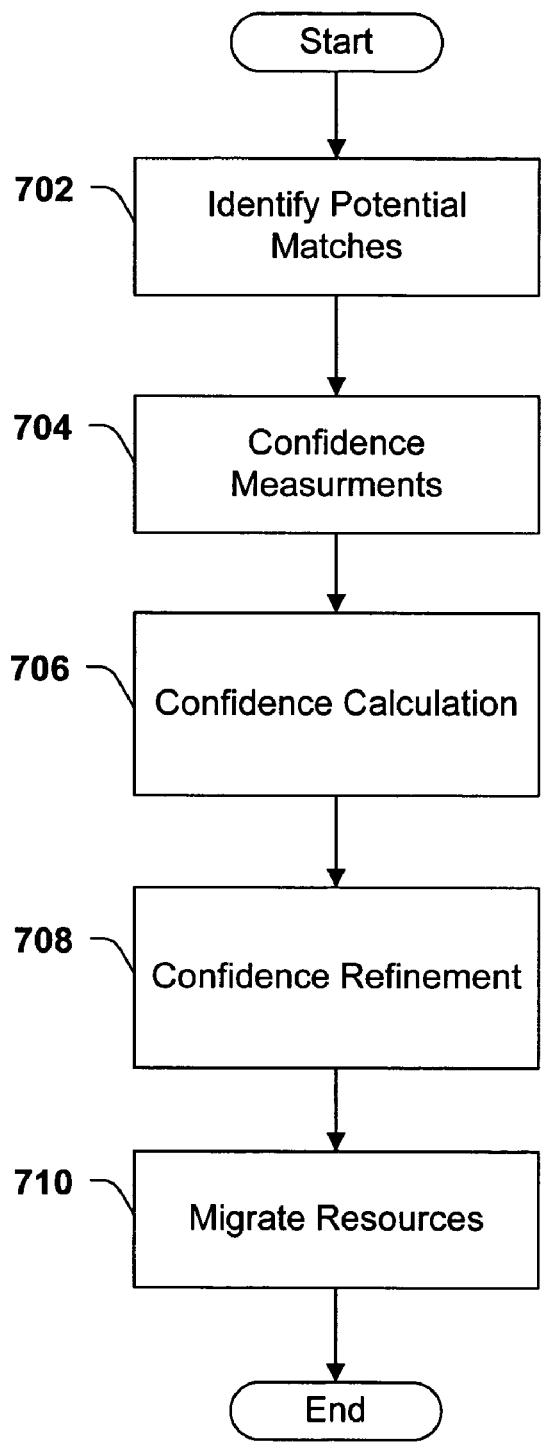
FIG. 7 illustrates a flow diagram representing an exemplary embodiment for an indirect resource matching algorithm, in accordance with one embodiment of the present invention.

FIG. 7 illustrates a flow diagram representing an exemplary embodiment for an indirect resource matching algorithm in accordance with one embodiment. When process 700 starts, a new version of a software product has been created and the localizable resources have been identified and stored in a localization database. Processing continues with matching identification operation 702.

Matching identification operation 702 identifies potential matches between resources of the old database and shifted resources of the new database. The potential matches may be identified according to direct matching of a source term (i.e., the localizable text) and, if applicable, source binary data. Source binary data corresponds to when resources have, apart from localizable text, other properties like size, or position on dialog (for example a button). Once potential matches are identified, processing continues with confidence measurements operation 704.

Confidence measurements operation 704 makes additional measurements associated with the resource data to attempt to increase the confidence that a match is discovered. For example, the confidence may be increased by matching a hotkey character and position between resources. Often resources (e.g., dialogs) have one (and only one) special character which is its keyboard shortcut or hotkey. Accordingly, matching hotkeys may denote matching resources. Additionally, confidence may be increased by matching of the resource category. In one embodiment, each resource is categorized by the parser. For example, the resource may be categorizes as a button, dialog title, static text, or other type. Matching categories may denote matching resources. Confidence may be further increased by matching of the parent nodes. In one embodiment, each resource has a "parent" in the localization database. For example, the filename it was originally retrieved from may be considered the parent node of particular resource. If the filenames match, the resources may match as well. Once the confidence measurements are complete, processing continues to confidence calculation operation 706.

Confidence calculation operation 706, takes the information from the indirect resource matching algorithm and the confidence measurements and produces a confidence value for potential matches between resources. In one embodiment, the calculation of the confidence value happens along the following exemplary steps: (1) if source text (and applicable, source binary data) match, award 40%; (2) if the hotkey character matches, award 5%; (3) if the hotkey position matches, award 5%; and (4) if the resource category matches, award 10%. Once the confidence value is calculated, processing continues to confidence refinement operation 708.

Confidence refinement operation 708, continues with the group of potential matches with the highest confidence value and further refines the confidence value for the potential matches. For example, if X remaining potential matches follow user specified hints, award 20/X % to those potential matches. Continue with the potential matches with the highest confidence value, and determine if Y remaining potential matches have matching parent nodes, awarding 20/Y % to those potential matches. Again, continue with the potential matches with the highest confidence value. Z potential matches remain. For each of these matches, add the remainder percentage (this number is depending on whether hints were specified, and parent nodes matched) divided by Z. The confidence calculations and confidence value refinements are summarized in the following table (Table 1):

TABLE 1

| Match Attempt | Confidence Value |
|---|---|
| Source String | 40 |
| If applicable: Source Binary Data | |
| Hotkey Character | 5 |
| Hotkey Position | 5 |
| Resource Category | 10 |
| X potential matches follow a specified hint | 20/X |
| Y resources have matching parent nodes | 10/Y |
| Z potential matches remain | remainder/Z |
| Total | 100% |

Once the confidence value refinement is complete, processing continues with mapping selection operation 710.

Mapping selection operation 710 provides for selection of the mappings that indicate a match between resources of the different software versions. Once a mapping selection is made, process 700 ends and processing moves onto migrating the localization data of the matching resources or other localization tasks.

The hints provide an affective method for determining the matching resources. For example a control on a dialog may have the following resource identifiers, before and after the resource shift:

(9) wkssdlng.dll|dialog|1008|2126;win_dlg_ctrl_, 128; and

(10) wkssdlng.dll|dialog|2006|554;win_dlg_ctrl_,128;

where resource identifier (9) is the identifier before the resource shift, and identifier (10) is the identifier after the shift.

The parser that deals with these kinds of resources creates a unique identifier for each dialog, and each control on that dialog. The introduction of the new feature caused the dialog and control numbering to happen differently in the new situation. Most of the resources (strings and controls) are matched upon this dialog by the matching algorithm outlined above. However, with generic controls (that are duplicated across many of the dialogs, like a Cancel button), more difficulties would arise.

Intermediate results from an initial analysis might show that dialog "1008" should be mapped to dialog "2006". To that extent, certain potential matches may be favored by using a hint. In one embodiment, a hint may be specified as follows:

```
<Hints>
    <LookFor old="dialog|1008" new="dialog|2006" />
</Hints>
```

This instruction boosts the confidence for potential matches whose old and new resource identifier follow the pattern as specified in the hint. This is particularly useful in case of many potential matches for one resource. When every other step in the algorithm fails to make a difference in the calculated confidence value, this hint proves to be vital.

The potential matches found may be output in a simple format for review. For example, table 2 illustrates an exemplary output for review of the potential matches, before a hint is applied.

TABLE 2

| Source Term | Old ResourceID | New ResourceID | Conf | Migrate |
|---|---|---|---|---|
| ... | | | | |
| Shading and Color | wkssdlng.dll|dialog|1008;5 | wkssdlng.dll|dialog|2006;5 | 100 | Yes |
| ... | | | | |
| Save As ... | wkssdlng.dll|menu|4000|5604;win_menu | wkssdlng.dll|menu|3101|576;win_menu | 93 | No |
| Save As ... | wkssdlng.dll|menu|4000|5604;win_menu | wkssdlng.dll|menu|3102|576;win_menu | 93 | No |
| Save As ... | wkssdlng.dll|menu|4000|5604;win_menu | wkssdlng.dll|menu|3103|576;win_menu | 93 | No |
| Save As ... | wkssdlng.dll|menu|4001|5604;win_menu | wkssdlng.dll|menu|3101|576;win_menu | 93 | No |
| Save As ... | wkssdlng.dll|menu|4001|5604;win_menu | wkssdlng.dll|menu|3102|576;win_menu | 93 | No |
| Save As ... | wkssdlng.dll|menu|4001|5604;win_menu | wkssdlng.dll|menu|3103|576;win_menu | 93 | No |
| Save As ... | wkssdlng.dll|menu|4002|5604;win_menu | wkssdlng.dll|menu|3101|576;win_menu | 93 | No |
| Save As ... | wkssdlng.dll|menu|4002|5604;win_menu | wkssdlng.dll|menu|3102|576;win_menu | 93 | No |
| Save As ... | wkssdlng.dll|menu|4002|5604;win_menu | wkssdlng.dll|menu|3103|576;win_menu | 93 | No |
| ... | | | | |
| Company on the Web | wkssdlng.dll|menu|4002|635;win_menu,8 | wkssdlng.dll|menu|3103|531;win_menu,8 | 100 | Yes |
| ... | | | | |

The table includes columns for a source term, old resource identifier, new resource identifier, confidence value, and migrate flag. If this mapping table is used in the subsequent data migration, the migrate flag indicates whether a particular match should be migrated. This flag is set to 'Yes' by default in case of a unique match with a confidence >95%. This threshold value is configurable and a selection of 95% is exemplary only.

The output shows clearly that resources are matched up when they include a unique text like "Shading and Color". However, three shifted menus have a "Save As" item on them, which are identical. Therefore, the system is unable to make the choice without assistance. However, by examining the other results it might be possible to come up with hints as described above. The perfect match for the resource "Company on the Web" clearly indicates that menu "4002" has shifted and is now called menu "3103". Similar matches eventually yield to the following extra instructions for the matching algorithm:

```
<Hints>
    <LookFor old="menu|4000" new="menu|3101" />
    <LookFor old="menu|4001" new="menu|3102" />
    <LookFor old="menu|4002" new="menu|3103" />
</Hints>
```

In one implementation, analyzing the intermediate results and adding hints to the configuration is a manual process. In another implementation, this may be an automated process.

Running the Matching algorithm again with the hint instructions added in results in an output as follows:

TABLE 3

| Source Term | Old ResourceID | New ResourceID | Conf | Migrate |
|---|---|---|---|---|
| ... | | | | |
| Shading and Color | wkssdlng.dll|dialog|1008;5 | wkssdlng.dll|dialog|2006;5 | 100 | Yes |
| ... | | | | |
| Save As ... | wkssdlng.dll|menu|4000|5604;win_menu | wkssdlng.dll|menu|3101|576;win_menu | 100 | Yes |
| Save As ... | wkssdlng.dll|menu|4001|5604;win_menu | wkssdlng.dll|menu|3102|576;win_menu | 100 | Yes |
| Save As ... | wkssdlng.dll|menu|4002|5604;win_menu | wkssdlng.dll|menu|3103|576;win_menu | 100 | Yes |
| ... | | | | |
| Company on the Web | wkssdlng.dll|menu|4002|635;win_menu,8 | wkssdlng.dll|menu|3103|531;win_menu,8 | 100 | Yes |
| ... | | | | |

Once the user is satisfied with the results of the analysis, the mapping table that has resulted may be used to migrate localization data from the old database to the new database, for one or more languages available.

The migration module (630 of FIG. 6) uses the results of the matching algorithm where the migrate flag is set to "Yes". The localization data (translations, sizing\positioning information, etc) is then migrated from the old database to the new database using the mapping information in the analysis results.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for recovery of localization data between different versions of a software product, the method comprising:
   identifying a first resource in a first version of the software product;
   identifying a second resource in a second version of the software product, wherein the second version of the software product changes resource identifiers between the first version and the second version of the software product, wherein a first resource identifier associated with the first resource is different from a second resource identifier associated with the second resource such that the difference between the resource identifiers is a shifted version of the resource and causes the second resource of the second version to not be recognized as matching the first resource of the second version of the software product;
   obtaining mapping information and mapping the first resource identifier to the second resource identifier using the mapping information when the second resource is found to be the shifted version of the first resource; and
   migrating the localization data corresponding to the first resource from the first version to the second version and associating the localization data with the second resource from the second version when the second resource is the shifted version of the first resource.

2. The computer-implemented method of claim 1, wherein mapping the first resource to the second resource further comprises identifying the first resource as matching the second resource despite a node of the first resource identifier being different from a node of the second resource identifier.

3. The computer-implemented method of claim 1, wherein mapping the first resource to the second resource further comprises providing a first format for the first resource identifier and relating the first format to a second format for the second resource identifier.

4. The computer-implemented method of claim 3, wherein at least one of the first format and the second format includes a regular expression.

5. The computer-implemented method of claim 4, wherein the regular expression corresponds to a random value when the regular expression is included in the first resource identifier.

6. The computer-implemented method of claim 4, wherein the regular expression corresponds to value associated with the first resource identifier when the regular expression is included in the second resource identifier.

7. The computer-implemented method of claim 1, wherein mapping the first resource to the second resource further comprises determining a confidence level that the first resource matches the second resource.

8. The computer-implemented method of claim 7, wherein the confidence level factors in at least one measurement including whether source text of the first resource matches sources text of the second resource, whether a hotkey of the first resource matches a hotkey of the second resource, whether a hotkey position of the first resource matches a hotkey position of the second resource, and whether a resource category of the first resource matches a resource category of the second resource.

9. The computer-implemented method of claim 8, wherein the measurement is weighted when applied to produce the confidence level.

10. The computer-implemented method of claim 7, wherein a hint is applied to mapping the first resource to the second resource, such that the hint increases the confidence level.

11. The computer-implemented method of claim 1, wherein migrating the localization data further comprises migrating the localization data from a first localization database associated with the first version of the software product to a second localization database associated with a second version of the software product.

12. The computer-implemented method of claim 1, further comprising identifying a set of potential matches to the first resource before mapping the first resource to the second resource.

13. The computer-implemented method of claim 12, further comprising providing the identified set of potential matches to a user for review such that the user is allowed to provide a hint to refine the set of potential matches.

14. The computer-implemented method of claim 1, wherein mapping the first resource to the second resource further comprises applying a hint to the mapping so that the results of the mapping are refined.

15. A computer-readable medium having stored thereon instructions that when executed implements the computer-implemented method of claim 1.

16. A system for recovery of localization data between different versions of a software product, comprising:

a processor and a computer-readable storage medium;

storing a first set of resources for a first version of the software product, wherein the first set of resources includes a first resource identifier;

storing a second set of resources that corresponds to a second version of the software product, wherein the second set of resources includes a second resource identifier, wherein the second version of the software product changes resource identifiers between the first version and the second version of the software product, wherein the first resource identifier is different from the second resource identifier such that the difference between the resource identifiers is a shifted version of the resource and wherein the resource shift causes the second resource of the second version to not be recognized as matching the first resource of the second version of the software product; obtaining mapping information and mapping the first resource identifier to the second resource identifier using the mapping information when the second resource is found to be the shifted version of the first resource; and migrating the localization data corresponding to the first resource from the first version to the second version and associating the localization data with the second resource from the second version when the second resource is the shifted version of the first resource.

17. The system of claim 16, wherein a relationship between the second resource and the first resource is discovered by identifying the mapping information that associates a format associated with the second resource to another format associated with the first resource.

18. The system of claim 16, wherein a relationship between the second resource and the first resource is discovered by determining whether a confidence level attributed to the relationship is at a predetermined level, wherein the confidence level is calculated based on whether aspects of the second resource matches similar aspects of the first resource.

19. A computer-readable storage medium having stored thereon instructions that when executed implements the system of claim 16.

20. A computer-readable storage medium having stored thereon computer-executable instructions for recovery of localization data between different versions of a software product, the computer-executable instructions comprising:

identifying a first resource in a first version of the software product;

identifying a second resource in a second version of the software product, wherein the second version of the software product changes resource identifiers between the first version and the second version of the software product, wherein a first resource identifier associated with the first resource is different from a second resource identifier associated with the second resource such that the difference between the resource identifiers is a shifted version of the resource and causes the second resource of the second version to not be recognized as matching the first resource of the second version of the software product;

obtaining mapping information and mapping the first resource identifier to the second resource identifier using the mapping information when the second resource is found to be the shifted version of the first resource; and migrating the localization data corresponding to the first resource from the first version to the second version and associating the localization data with the second resource from the second version when the second resource is the shifted version of the first resource.

* * * * *